(12) United States Patent
Flynn et al.

(10) Patent No.: US 6,881,461 B2
(45) Date of Patent: Apr. 19, 2005

(54) INDEXABLE LABEL ASSEMBLY

(76) Inventors: Timothy J. Flynn, 18 Caloosa Rd., Key Largo, FL (US) 33037; Thomas E. Flynn, 7305 Gleneagle Cir., Crystal Lake, IL (US) 60014; Patrick J. Flynn, 107 Jennifer St., Redlands, CA (US) 92373

( * ) Notice: Subject to any disclaimer, the term of this patent is extended or adjusted under 35 U.S.C. 154(b) by 0 days.

(21) Appl. No.: 10/369,176

(22) Filed: Feb. 19, 2003

(65) Prior Publication Data

US 2004/0137198 A1 Jul. 15, 2004

Related U.S. Application Data

(60) Provisional application No. 60/439,121, filed on Jan. 10, 2003.

(51) Int. Cl.[7] .................................................. G09F 3/00
(52) U.S. Cl. .................... 428/40.1; 428/42.1; 428/42.2; 428/42.3; 428/43; 428/66.6; 428/66.7; 428/131; 428/192; 428/194
(58) Field of Search ............................ 428/40.1, 42.1, 428/42.2, 42.3, 43, 192, 194, 66.6, 66.7, 131

(56) References Cited

U.S. PATENT DOCUMENTS

| | | | |
|---|---|---|---|
| 465,588 A | 12/1891 | Wheeler | |
| 1,500,698 A | 7/1924 | Wiehl | |
| 1,821,916 A | 9/1931 | Acheson et al. | |
| 4,084,015 A | 4/1978 | Patterson | |
| 5,334,432 A | 8/1994 | Long | |
| 5,925,200 A | 7/1999 | Grossman | |
| 6,054,009 A | 4/2000 | Cote et al. | |
| 6,273,167 B1 | 8/2001 | Miller | |
| 6,318,436 B1 | 11/2001 | Hummell et al. | |
| 6,321,811 B1 | 11/2001 | Atkinson et al. | |
| 6,347,654 B1 | 2/2002 | Koch | |
| 6,363,987 B1 | 4/2002 | Koch | |
| 6,405,777 B1 | 6/2002 | Lebbad | |
| 6,408,918 B1 | 6/2002 | Hummell et al. | |
| 6,431,238 B1 | 8/2002 | Atkinson | |
| 6,689,238 B2 * | 2/2004 | Barnet .......................... 156/60 |
| 6,776,208 B1 * | 8/2004 | Flynn et al. ................. 156/391 |
| 6,776,866 B2 * | 8/2004 | Flynn et al. ................. 156/247 |
| 6,776,867 B2 * | 8/2004 | Flynn et al. ................. 156/247 |
| 6,799,621 B2 * | 10/2004 | Flynn et al. ................. 156/391 |
| 6,805,180 B2 * | 10/2004 | Flynn et al. ................. 156/391 |
| 2001/0025689 A1 | 10/2001 | Barnet | |

FOREIGN PATENT DOCUMENTS

| | | |
|---|---|---|
| DE | 296 13 123 U1 | 1/1997 |
| DE | 296 20 077 U1 | 5/1998 |
| DE | 298 00 751 U1 | 7/1998 |
| DE | 200 12 331 U1 | 3/2001 |
| EP | 1 081 050 A1 | 7/2001 |
| EP | 1 264 772 A2 | 12/2002 |
| WO | WO 02/38371 A1 | 5/2002 |

* cited by examiner

*Primary Examiner*—Nasser Ahmad
(74) *Attorney, Agent, or Firm*—Pauley Petersen & Erickson

(57) ABSTRACT

A label assembly for a CD includes a face sheet having a generally circular label portion removable with respect to a carrier portion of the face sheet and at least one index hole positioned in the face sheet, the at least one index hole mateable with an applicator apparatus.

12 Claims, 13 Drawing Sheets

INDEXABLE LABEL ASSEMBLY

This application claims the benefit of U.S. provisional Ser. No. 60/439,121 filed Jan. 10, 2003.

BACKGROUND OF THE INVENTION

1. Field of the Invention

This invention is directed to a label assembly and apparatus for the positive, indexed application of labels to objects such as CDs.

2. Description of Related Art

Labels such as those described herein can be used in connection with a wide variety of items, particularly, compact discs (CDs), jewel cases and the like. It is desirable to have a label for adhering to items that will apply straight and direct to the object without misalignment, wrinkles, bubbles, folds or other errors inherent in the application of adhesive-backed labels to items.

In addition, labels improperly affixed to objects, such as CDs, with adhesive can harm the discs if a user attempts to remove and/or straighten the labels. More specifically, damage may be caused by pulling off some of the disc protective coating, metal and dye along with the label. In addition, when a traditional label is peeled from its backing, the traditional label includes an inherent curling that may manifest itself a period of time later by peeling away from the object. This peel memory is problematic with tradition peel and stick labels and particularly destructive when used in connection with CDs that require high-speed, balanced rotation for proper operation.

Accordingly, a need exists for a new and improved label or label assembly that provides means for labeling the CDs and related goods in an accurate and positive fashion. A further need exists for a label assembly that can be easily manufactured and assembled to form a label that may be applied in a consistent manner.

SUMMARY OF THE INVENTION

The present invention relates to a label assembly and an applicator apparatus, for use either independently or in tandem. The label assembly is of any suitable shape, and generally any suitable size that can be accepted by and fed through a printer, such as a laser printer or an ink jet printer. The label assembly preferably includes a face sheet and a back sheet with a layer of adhesive between. The adhesive is preferably applied to one side of the face sheet with an opposite side of the face sheet having a printable surface.

The label assembly according to a preferred embodiment of this invention further includes the face sheet having a label portion removable with respect to a carrier portion. The label portion is preferably pre-cut or shaped into a desired form for application in a desired manner, such as a CD.

The back sheet of the label assembly preferably includes a first portion that is removable with respect to a second portion. The back sheet preferably includes one side having a treated surface to facilitate removal of the back sheet relative to the face sheet. Therefore, at least one side of the back sheet preferably includes a smooth and/or waxy surface to ease separation from the adhesive side of the face sheet. The side opposite the treated surface of the back sheet may be a printable surface or any other suitable surface.

The first portion of the back sheet is preferably generally coextensive with the label portion of the face sheet. Likewise, the second portion of the back sheet is preferably generally coextensive with the carrier portion of the face sheet. When the first portion is removed from the label assembly, the second portion of the back sheet is attached to, and supports, the label portion of the face sheet. In one embodiment of this invention, a circular label portion is retained following removal of a first portion that is generally circular and generally coextensive with label portion and includes two or more areas of overlap from the back sheet to the label portion. The areas of overlap may comprise two or more retainers that extend from the second portion and adhere to the label portion.

The label assembly may include one or more center holes and/or index holes that are removed as the first portion is removed. Such center holes and/or index holes may be used to align the label assembly onto a suitable applicator apparatus.

The apparatus for use in applying the label assembly may include a base and/or a center stem and/or one or more locating elements. The center stem of the apparatus may be mateable with the center hole of the label assembly. Similarly, the locating elements may be mateable with one or more index holes of the label assembly.

As a result of the configuration of the label assembly and/or the apparatus, the label portion is positioned so that the adhesive side of label portion faces upward from the base. When an object, such as a CD, is positioned on the apparatus and the label assembly, the label portion is transferred in a desired manner onto such object.

In operation, and as described above, the carrier portion of the label assembly remains on the apparatus following application of the label portion to the CD or other labeled object. Accordingly, the label portion is separated from the remaining label assembly, leaving the carrier portion in position on the apparatus. As a result, a second labeling operation may be used to transfer one or more additional label portions onto an object using the same label assembly. The additional label portion may include a spine label for application to a CD jewel case and/or any other suitable labels including traditional peel and stick labels.

An arm may be used on the base to contact at least a portion of the label assembly, so that as the label portion is removed from the face sheet, the remainder of the face sheet and/or the carrier portion is retained and therefore the label portion separates cleanly from the carrier portion. The arm may further include a locating aperture that corresponds with a size and placement of a label portion when the arm is in a flush position relative to the base. As a result, an object may be inserted through the locating aperture in the arm to transfer the label portion of the face sheet onto the object.

It is therefore an object of the present invention to provide a label or label assembly, that is suitable to be adhered to a compact disc (CD) or digital video disc (DVD).

It is a further object of the present invention to provide a label assembly that includes a label portion in a plane with the adhesive side facing upwards.

It is another object of the present invention to provide a label assembly that is indexable within an apparatus to provide uniform and repeatable application to an object.

It is yet another object of the present invention to provide a label assembly that includes index holes that mate with locating elements in an applicator apparatus.

It is also another object of the present invention to provide an apparatus for applying a label portion of a label assembly to an object that includes a moveable arm for maintaining a portion of the label assembly in a stationary position as the label portion is transferred to the object.

It is yet another object of the present invention to provide a label and/or label assembly suitable for labeling CDs and DVDs that does not adversely affect CDs and DVDs.

The foregoing and other features and advantages of the present invention will become further apparent from the following detailed description of the presently preferred embodiments, read in conjunction with the accompanying drawings. The detailed description and drawings are intended to illustrate the present invention rather than limit the scope of the present invention as defined by the appended claims and equivalents of the appended claims.

BRIEF DESCRIPTION OF THE DRAWINGS

The present invention can be better understood with reference to the following drawings. In the drawings, like reference numerals designate corresponding parts throughout the several views. Moreover, it should be noted that the drawings are not necessarily to scale, emphasis instead being placed upon clearly illustrating principles of the present invention.

DETAILED DESCRIPTION OF PREFERRED EMBODIMENTS

FIGS. 1–15 illustrate preferred embodiments of a label assembly 10 and apparatus 200 in accordance with the present invention. It is not necessary that apparatus 200 shown in FIGS. 1 and 2 be used with label assembly 10 shown in FIGS. 3–5 and vice versa; however, label assembly 10 and apparatus 200 may include features that are particularly useful when used together.

Figure 3:
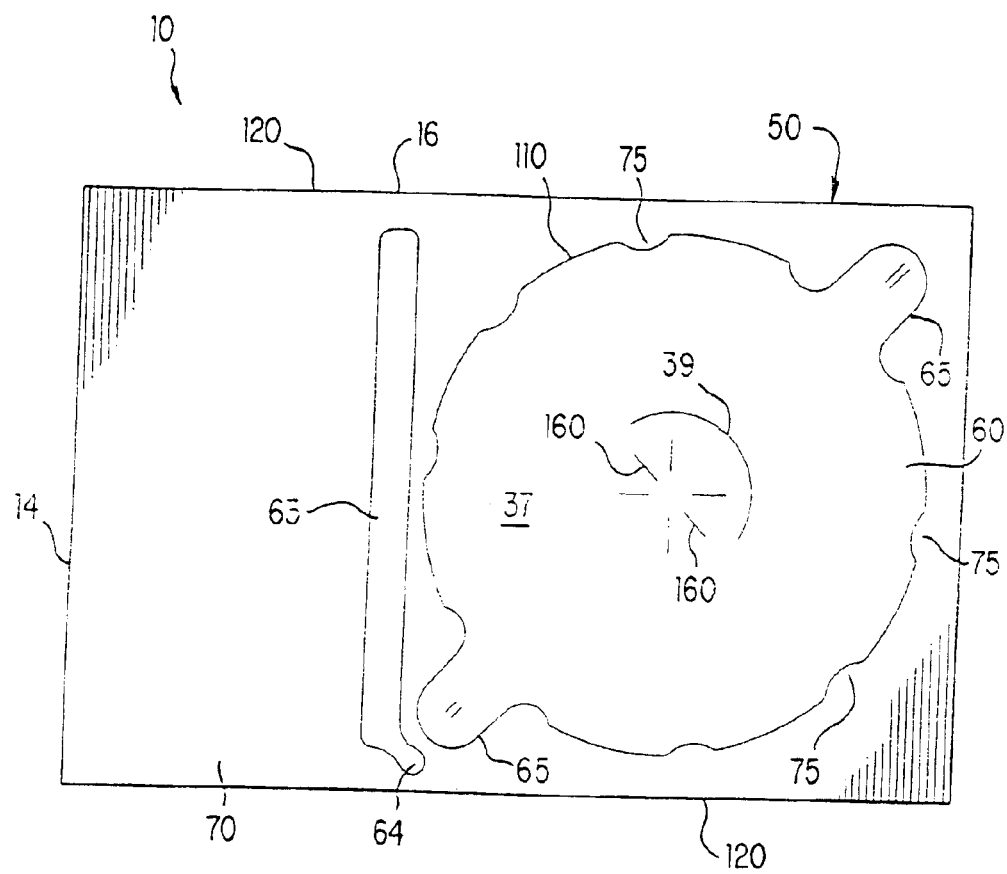
FIG. 3 illustrates a back sheet side view of a label assembly according to one preferred embodiment of this invention.

Referring generally to FIG. 3, label assembly 10 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. Label assembly 10 preferably comprises face sheet 20 and back sheet 30 with a layer of adhesive between.

Face sheet 20 is preferably but not necessarily constructed of any suitable paper, paper composite, non-metal and/or metal material that can be used as a label. Other suitable materials for constructing label sheet 20 include fabric, plastic, and metal foils. An adhesive coating is applied, in any suitable manner known to those skilled in the art, to one side of face sheet 20. Face sheet 20 preferably has a printable surface on a side opposite the adhesive side. The printable surface on face sheet 20 can be any of a variety of face materials used to make pressure sensitive, or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts, such as the first portion 60 and/or label portion 30, as described more below.

As used throughout this specification and in the claims, the term "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

When manufacturing label assembly 10, face sheet 20 of material can originate from a long, continuous web of material later to be cut into separate sheets each having label assembly 10. For example, label assembly 10 in FIG. 1 can be separated from adjacent label assemblies 10 connected to each respective lateral edge 14 and/or longitudinal edge 16. In order to provide a clean cut between adjacent label assemblies 10, taking into account manufacturing registration needs or a margin of error in spacing the cut, registration lines may extend between adjacent label assemblies 10. The registration lines are preferably but not necessarily substantially perpendicular to the resulting edge of an upline label assembly 10, and the resulting edge of a downline label assembly 10.

Label assembly 10 of the present invention is suitable for a wide number of uses. Prior to assembling, label assembly 10 can be fed into and run through a printer for labeling and/or decorating any portion. Label assembly 10 therefore includes at least one printable side for accepting printing, such as descriptive and/or decorative material.

Label assembly 10 according to a preferred embodiment of this invention includes face sheet 20 having label portion 30 removable with respect to carrier portion 40 of face sheet 20. Label portion 30 is preferably pre-cut or shaped into a desired form for application in a desired manner, such as a CD.

Back sheet 50 of label assembly preferably includes first portion 60 that is removable with respect to second portion 70. Back sheet 50 preferably includes one side having a treated surface to facilitate removal of back sheet 50 relative to face sheet 20. Therefore, at least one side of back sheet 50 preferably includes a smooth and/or waxy surface to ease separation from the adhesive side of face sheet 20. The side opposite the treated surface of back sheet 50 may be a printable surface or any other suitable surface.

Figure 5:
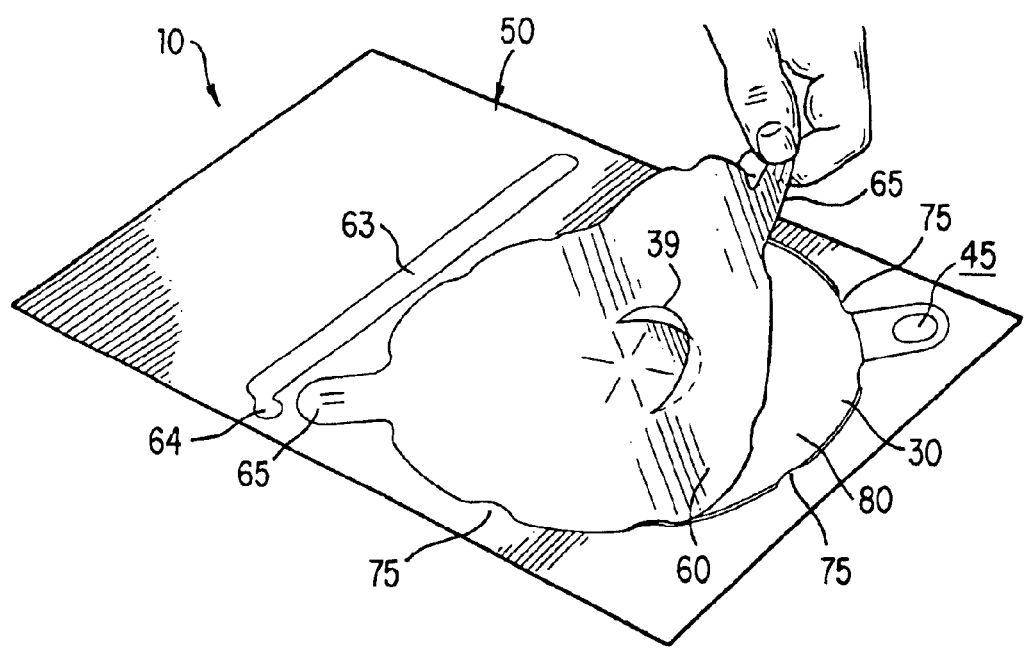
FIG. 5 illustrates a side perspective view of a label assembly as a first portion is removed from a label portion of the label assembly.

As shown in FIG. 5, first portion 60 of back sheet 50 is preferably generally coextensive with label portion 30 of face sheet 20. Likewise, second portion 70 of back sheet 50 is preferably generally coextensive with carrier portion 40 of face sheet 20.

As briefly described above, a layer of an adhesive is preferably positioned between face sheet 20 and back sheet 50 so that the adhesive adheres to face sheet 20 exclusively or at least adheres to face sheet 20 more than to back sheet 50. As a result of the above-described configuration, label assembly 10 includes face sheet 20 having a printable side and an opposite, adhesive side and a back sheet 50 including a separable side and an opposite side.

According to a preferred embodiment of this invention, when first portion 60 is removed from label assembly 10, second portion 70 of back sheet 50 is attached to label portion 30 of face sheet 20. Second portion 70 of back sheet 50 may be attached to label portion 30 entirely around a perimeter of label portion 30 or at one or more distinct points of label portion 30. According to a preferred embodiment of this invention, back sheet 50 is "attached" to label portion 30 if movement of back sheet 50 results in complementary movement of label portion 30.

According to one preferred embodiment of this invention, second portion 70 of back sheet 50 supports label portion 30 of face sheet 20. Second portion 70 may support label portion 30 in a number of ways. According to one preferred embodiment of this invention, shown in FIG. 9, first periphery 34 of label portion 30 is greater than second periphery 38 of first portion 60. Alternatively or in addition, a first area 37 of label portion 30 maybe greater than a second area 36 of first portion 60. Likewise, a first maximum chord length 90 of label portion 30 may be greater than second maximum chord length 95 of first portion 60.

Figure 4:
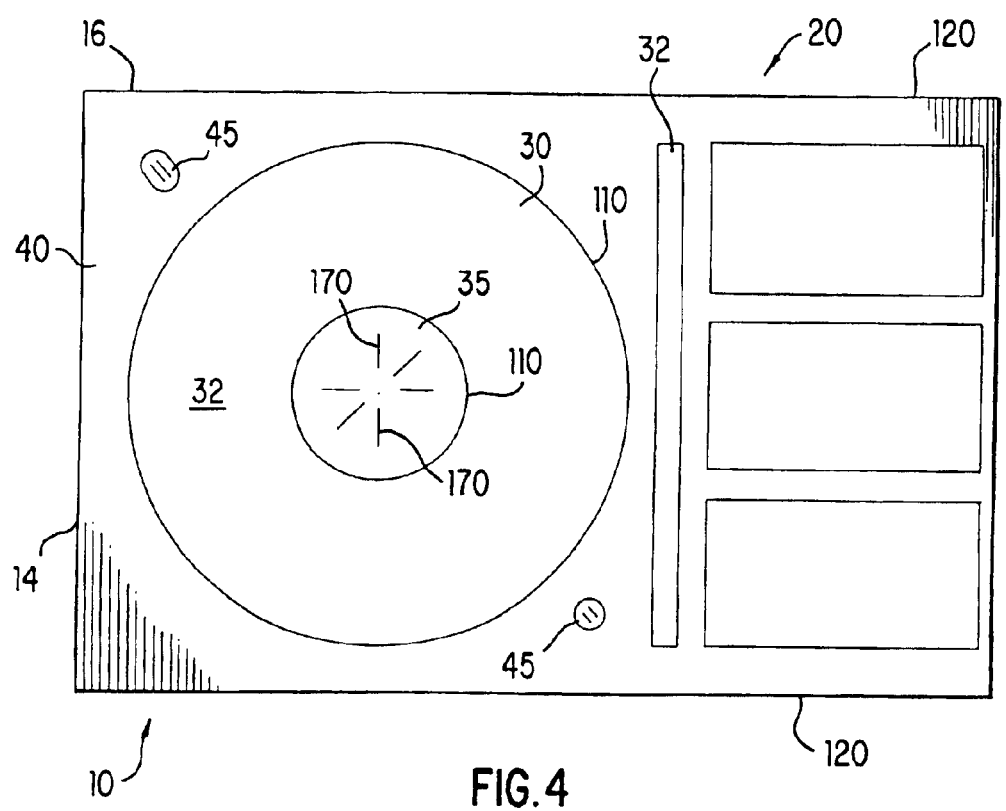
FIG. 4 illustrates a face sheet side view, opposite the view shown in FIG. 3, of the label assembly.

As shown in FIG. 4, label portion 30 may be circular, for instance to facilitate application to a CD, and includes first diameter 100. First portion 60 is preferably correspondingly circular and has second diameter 105 wherein first diameter 100 is greater than second diameter 105. Similarly, FIG. 5 shows circular label portion 30 and first portion 60 that is generally circular and generally coextensive with label portion 30 including two or more areas of overlap from back sheet 50 to label portion 30. The areas of overlap may comprise two or more retainers 75 extending from second portion 70 and adhering to label portion 30.

According to one preferred embodiment of this invention, label assembly 10 further includes at least one index tab 65 extending from a periphery of first portion 60. Index tab 65 may be positioned on two sides of first portion 60 such as shown in FIG. 3. Index tab 65 is preferably shaped in such a manner so as to facilitate peeling away of first portion 60.

According to one preferred embodiment of this invention, particularly for use with labels for CDs and DVDs, center hole 35 is preferably positioned in a center area of label portion 30. In addition, at least one index hole 45 may be positioned within carrier portion 40. Index hole 45, as shown in FIGS. 3–5 and 9, may be positioned directly underneath index tab 65 or in any other appropriate position on label assembly 10 including through back sheet 50 and/or face sheet 20.

According to a preferred embodiment of this invention, when first portion 60 is peeled away or otherwise removed from label portion 30, center hole 35 is opened and/or removed from label portion 30. Likewise, when first portion 60, including index tabs 65 is removed from label portion 30 and/or carrier portion 40, index hole 45 is opened and/or removed from label portion 30 and/or carrier portion 40.

Center hole 35, index hole 45 and/or any other cutout segment of face sheet 20 may be separated from a remaining portion of face sheet 20 using an arrangement of cuts such as shown in FIG. 3. As shown, one or more first cuts 160 may extend downwardly into first portion 60 and one or more second cuts 170 may extend upwardly into label portion 30 resulting in one or more alternating cuts extending in each direction through label assembly 10. As a result, first cut 160 and second cut 170 join a segment, section and/or cutout of label portion 30 and/or carrier portion 40 to the treated (removeable) side of first portion 60.

Alternatively, or in addition, and as shown in FIGS. 3–5, center hole 35 may be opened upon removal of first portion 60 using die cut 39 extending partially along a perimeter of center hole 35 through both face sheet 20 and back sheet 50. Die cut 39 is preferably generally arcuate and positioned along a side of center hole 39 that corresponds with a side of first portion 60 that is removed first, as particularly shown in FIG. 5. According to an embodiment of die cut 39 having an arcuate shape, the arc preferably extends between approximately 1° and 180° along center hole 35 and more preferably extends between approximately 5° and 90° along the center hole.

Alternatively, or in addition, center hole 35 may be opened upon removal of first portion 60 using an offset center hole 35 relative to a corresponding die cut 39 in first portion 60 alone.

As described above, first portion 60 is separable from label assembly 10 across one or more lines of separation 110 that are positioned in back sheet 50 and each extend from a boundary line between first portion 60 and second portion 70 and inward into back sheet 50. As a result of lines of separation 110, such die cuts, first portion 60 is separable from second portion 70. In certain instances, lines of separation 110 may result in some adherence between adjacent first portion 60 and second portion 70 because of interference between edges in addition to slight seepage of adhesive within lines of separation 110.

According to one particular embodiment of this invention, label assembly 10 is used for a CD or DVD and includes face sheet 20 having a circular label portion 30 that is removable with respect to carrier portion 40 of face sheet 20 and then applied to the CD. Back sheet 50 includes a generally circular first portion 60 removable with respect to second portion 70 of back sheet 50. Because first portion 60 of back sheet 50 is generally, but not truly, coextensive with label portion 30 of face sheet 20 includes a smaller surface area than label portion 30 of face sheet 20, label portion 30 is retained by second portion 70 of back sheet 50. Further, because the adhesive layer of label portion 30 is exposed, a CD may be placed on top of label assembly 10 thereby affixing label portion 30 to CD.

Because of the arrangement of label assembly described above and the apparatus described below, label portion 30 may be perfectly round to correspond with the diameters of a CD or may be decorative, such as including a fanciful flower or buzzsaw outline for unique applications. The shape of label portion 30 is not limited by the manner in which it is applied according to this invention because label portion 30 remains attached to carrier portion 40 until the object is applied and therefore is not subject to bending, curling, wrinkles and/or other imperfections which a fanciful outline may otherwise include. In other words, when a traditional label is removed from a back sheet and then applied to another object, the traditional label curls as it is removed and then tends to wrinkle or bend as it is applied. In contrast, label assembly 10 according to this invention, maintains label portion 30 in a flat and fixed position, the object to be labeled may be uniformly applied to the label rather than vice versa.

According to a preferred embodiment of this invention, label assembly 10 may include at least one additional label portion, such as additional portion 63, removable from back sheet 50 for use elsewhere in the particular application, for instance, for placement on a jewel case of the CD. Additional portion 63 may be arranged in the same way as label portion 30 or may otherwise be a traditional label that is removed from back sheet 50 for subsequent placement on an object.

FIGS. 1, 2, 6–8 and 10 illustrate preferred embodiments of apparatus 200 for use in applying label assembly 10 as generally described above and in accordance with the present invention. More particularly, FIGS. 1, 2, 6–8 and 10 show apparatus 200 according to various preferred embodiments of this invention, particularly suitable for applying a label to a CD, DVD or business-card CD. Apparatus 200 preferably includes base 210 and which is molded or otherwise formed of plastic, metal, wood or any other suitable strong, durable and generally rigid material known to those having ordinary skill in the art. Depending upon the desired application, base 210 may include a recessed and/or otherwise contoured portion for accommodating a particular object, such as a CD.

According to a preferred embodiment of this invention, for use with labeling CDs, base 210 includes center stem 220 extending from a center area of the contoured portion of base 210. Center stem 220 is preferably sized to fit through a CD aperture 310 and may include one or more particular features, such as described below, that positively maintain CD 300 in position and/or permit CD 300 to be lowered onto base in a uniform fashion.

Figure 1:
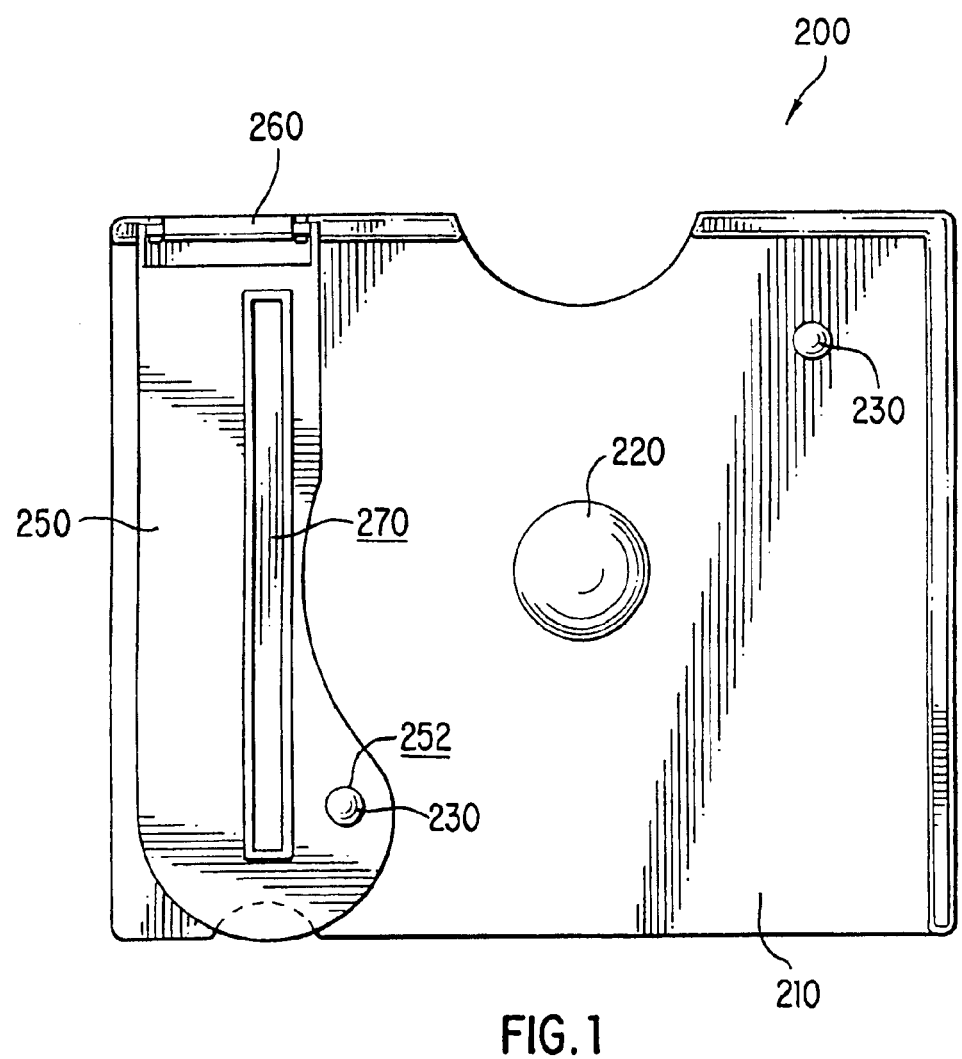
FIG. 1 illustrates a top view of an apparatus for applying a label according to one preferred embodiment of this invention.
Figure 2:
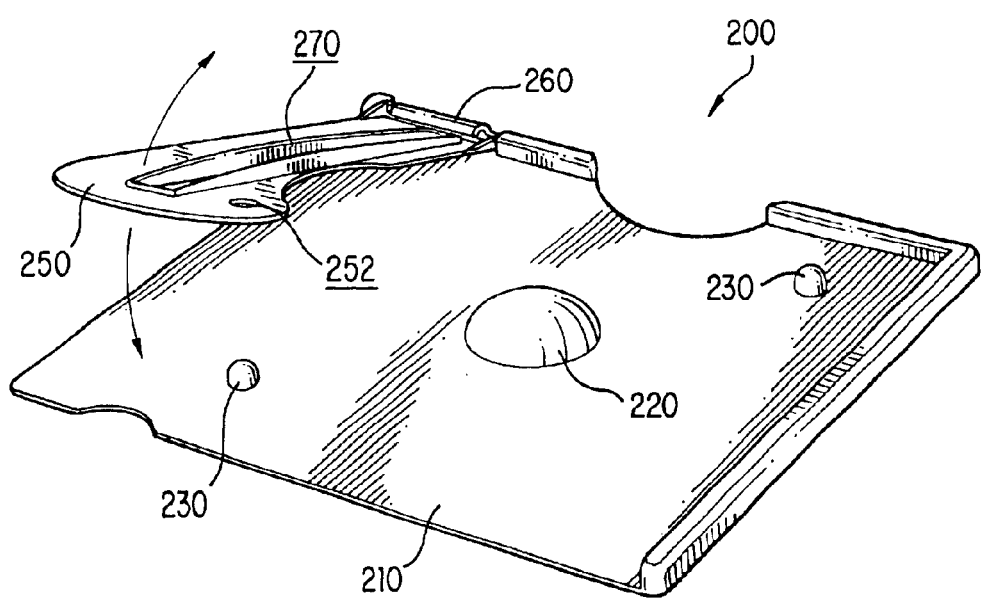
FIG. 2 illustrates a side perspective view of the apparatus shown in FIG. 1.

Apparatus 200 preferably further includes one or more locating elements 230 extending from base 210. FIGS. 1 and 2 shows two locating elements 230 extending from base 210, however, depending upon the application, base 210 may include one, two, three or many more locating elements 230, such as the four locating elements 230 shown in FIG. 10. Locating elements 230 are preferably mateable with index holes 45 and used to position label assembly 10 in a desired position on apparatus 200.

Label assembly 10 is preferably positioned on base 210, particularly within the contoured portion of base 210. As a result, label portion 30 of label assembly 10 is positioned so that the adhesive side of label portion 30 faces upward from base 210. As a result, when an object, such as CD 300, is positioned on apparatus 200 and label assembly 10, label portion 30 is transferred in a desired manner to such object.

Apparatus 200 as described can therefore accommodate label assembly 10 having index hole 45 to mate with locating element 230 and/or center hole 35 to mate with center stem 220. Therefore, when label assembly 10 is in an indexed position within apparatus 200, locating element 230 extends through index hole 45 and center stem 220 extends through center hole 35.

In operation, and as described above, carrier portion 40 remains on apparatus 200 following application of label portion 30 to the CD or other labeled object. Accordingly, label portion 30 is separated from the remaining label assembly 10, leaving carrier portion 40 in position on apparatus 200. As a result, a second labeling operation may be used to transfer one or more additional label portions onto an object using the same label assembly 10, such as described in more detail below.

Figure 6:
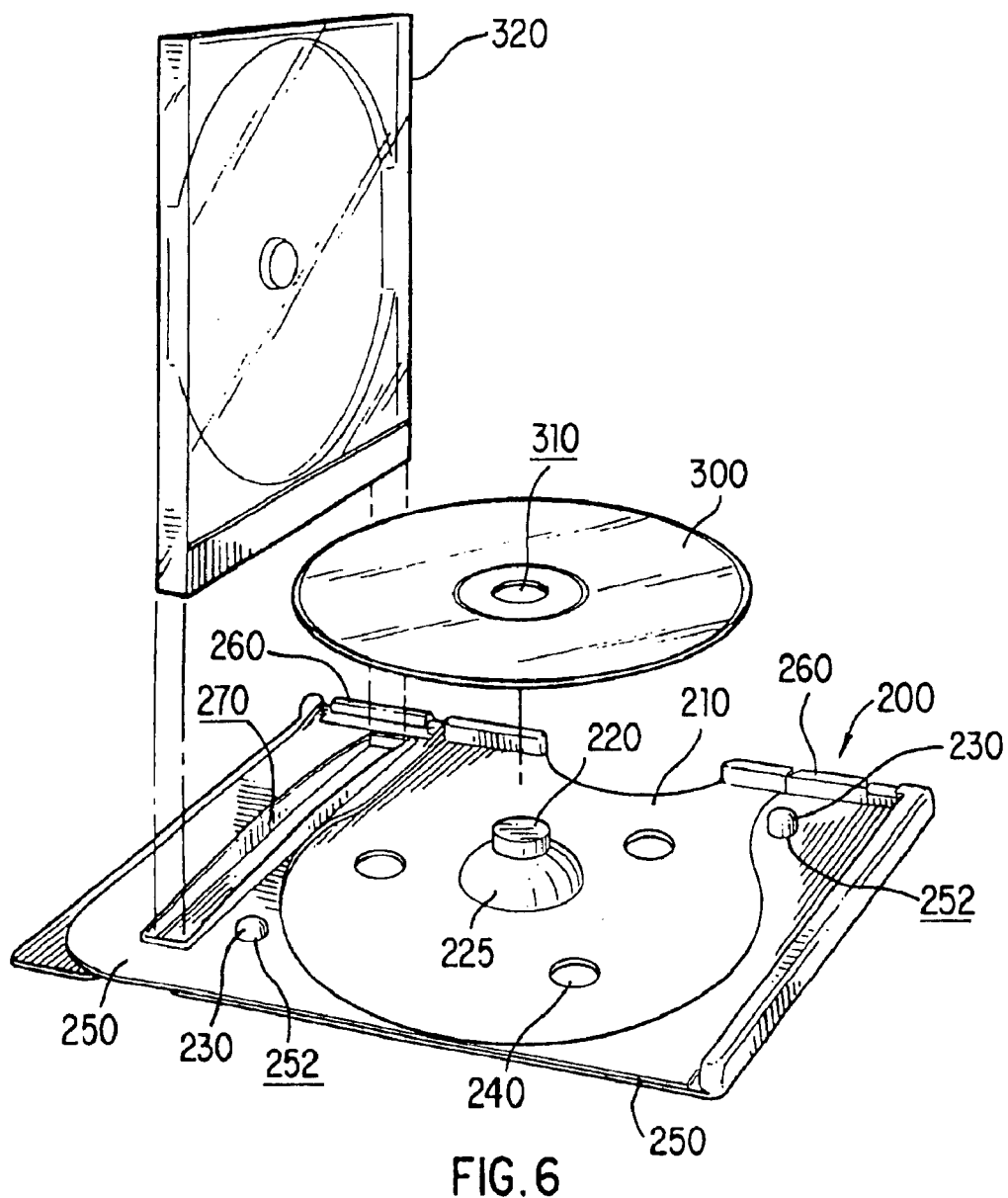
FIG. 6 illustrates an exploded side perspective view of an apparatus for applying a label without a label assembly in place according to one preferred embodiment of this invention.
Figure 7:
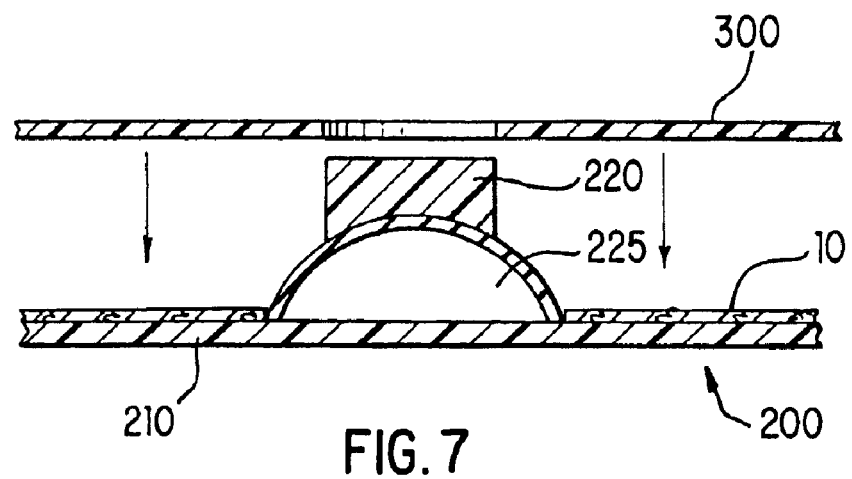
FIG. 7 illustrates a cross-sectional side view of an apparatus for applying a label to a CD prior to application according to one preferred embodiment of this invention.
Figure 8:
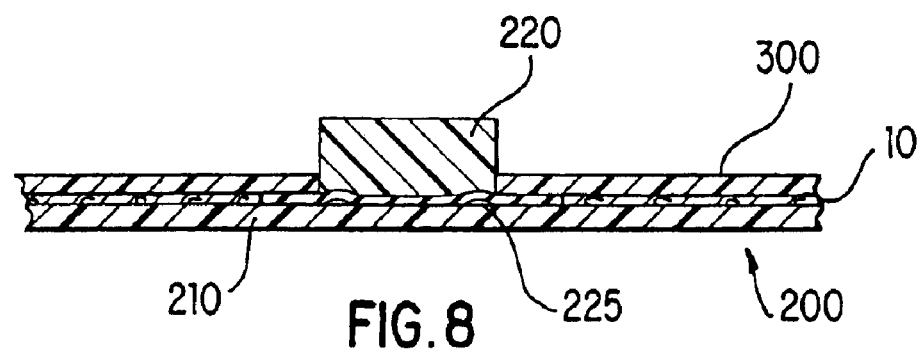
FIG. 8 illustrates a cross-sectional side view of the apparatus shown in FIG. 7 following application of the label to the CD.
Figure 9:
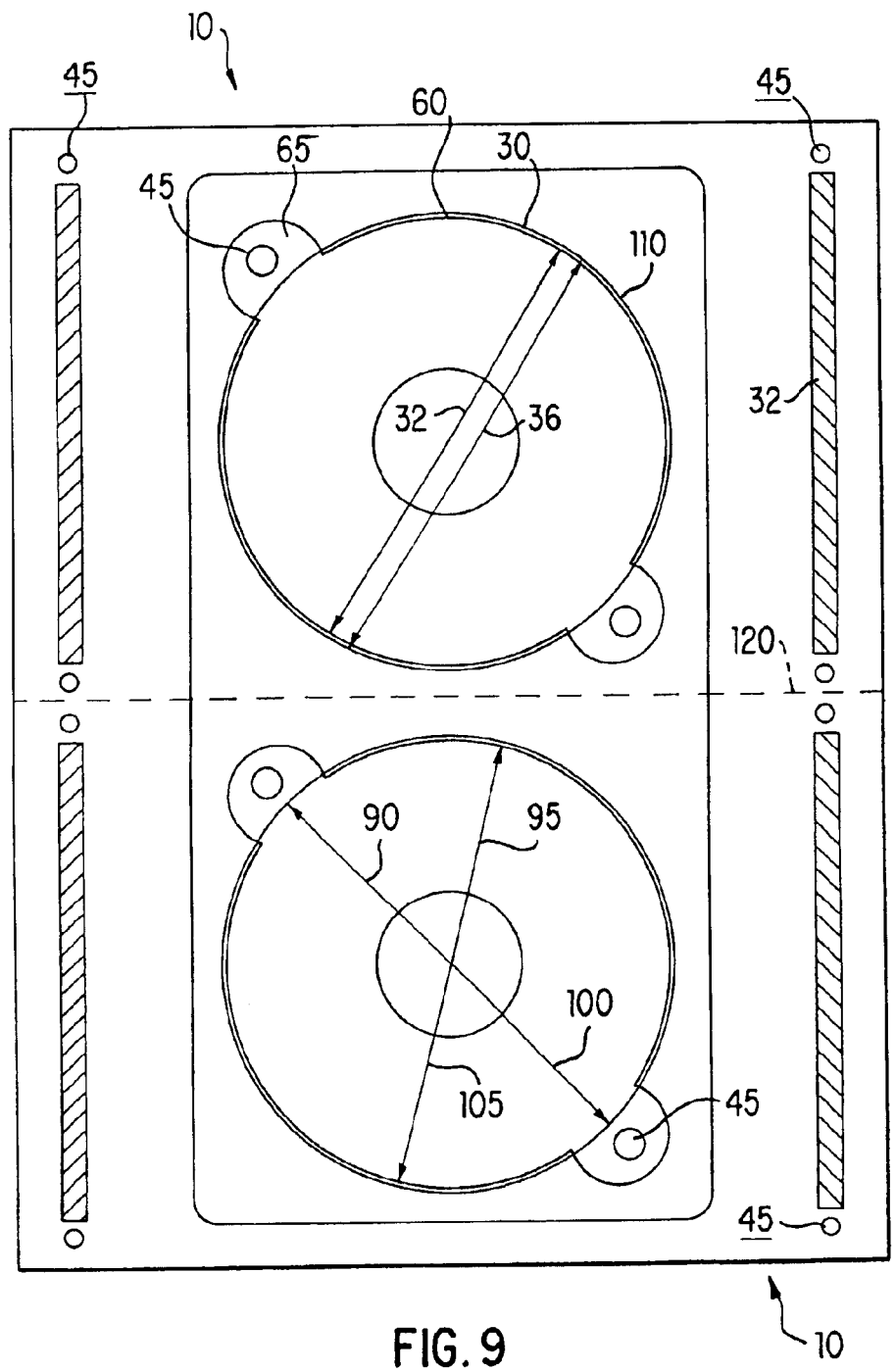
FIG. 9 illustrates a top view of a label assembly according to one preferred embodiment of this invention.
Figure 10:
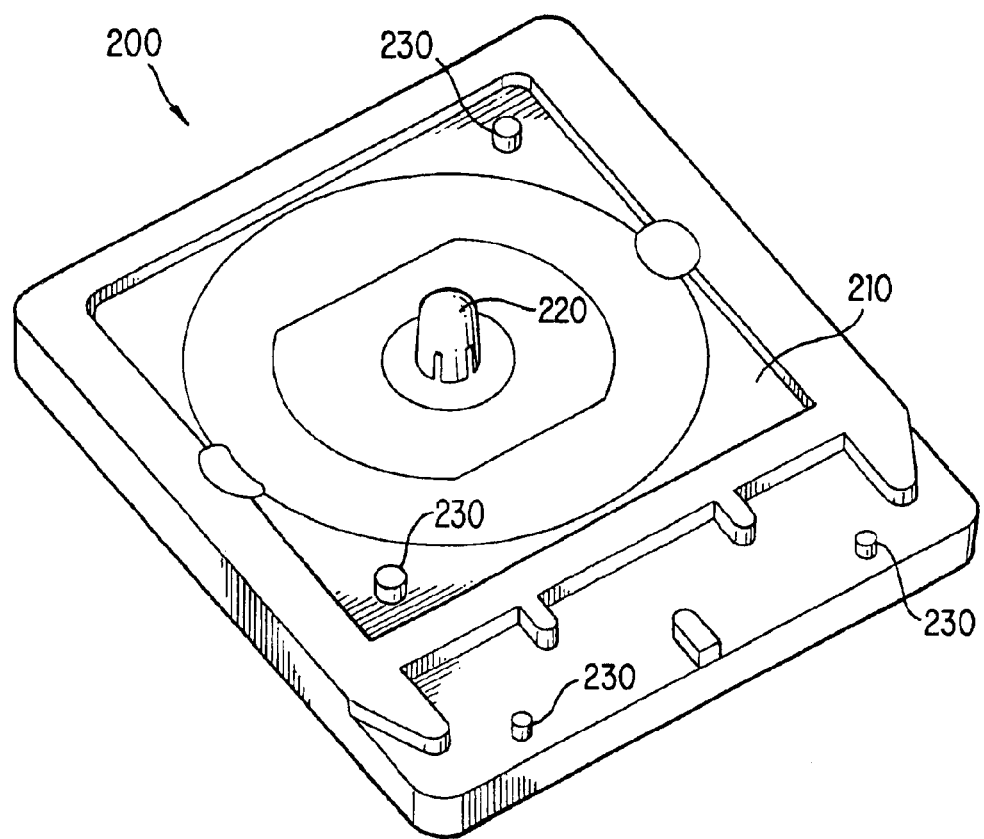
FIG. 10 illustrates a top perspective view of an apparatus for applying a label to an object according to one preferred embodiment of this invention.

According to a preferred embodiment of this invention, label portion 30 can be used as a label for CD 300 shown in FIG. 6. More particularly, the label portion 30 is die-cut, perforated, micro-perforated, or otherwise cut to form tearable line of separation which can be used to remove label portion 30 in any suitable shape, such as a circle, preferably of a slightly smaller surface area than a surface area of a CD 300.

In particular, a method for labeling a CD according to this invention, uses a label sheet (or label assembly 10) with back sheet 50 and face sheet 20 wherein face sheet 20 includes an adhesive side and a printable side. The user first removes first portion 60 of back sheet 50 from face sheet 20. As a result, label portion 30 of face sheet 20 is exposed so that the adhesive side faces upwards. The label sheet is then placed into an indexed position on apparatus 200. Finally, CD 300 is placed onto apparatus 200 resulting in label portion 30 transferring onto CD 300 in an aligned manner free of creases, bubbles or other irregularities.

As described above, the label sheet may be indexed on apparatus 200 using at least one index hole 45 corresponding with locating element 230 on apparatus 200. Alternatively, or in addition to index hole 45, the label sheet may be indexed on apparatus 200 using center hole 35 corresponding with center stem 220 of apparatus. Alternatively, or in addition to index hole 45 and/or center hole 35, the label sheet may be indexed on apparatus 200 using a contoured or otherwise uniquely defined surface on base 210.

As described above, prior to application of label portion 30 to CD or other object, label portion 30 is maintained within face sheet 20 with two or more retainers 75 positioned in back sheet 50 around a perimeter of label portion 30. Therefore, label portion 30 of face sheet 20 is exposed so that the adhesive side faces upwards and label assembly 10 is positioned in an indexed position on apparatus 200.

According to one preferred embodiment of this invention, a CD 300 or other object is placed onto apparatus 200, preferably so that center stem 220 extends through CD aperture 310. As a result of placing CD 300 on label portion 30 in this manner, and preferably applying light pressure, label portion 30 of face sheet 20 is transferred onto CD 300. According to one preferred embodiment of this invention, shown in FIGS. 6–8, center stem 220 may further include compressible element 225, such as a compressible dome, positioned beneath center stem 220 wherein compressible element 225 is compressible following application of a downward force. Compressible element 225 may be constructed of an elastic polymer, similar to that used underneath computer keyboard keys so that when a gentle downward force is applied, compressible element 225 compresses uniformly. As a result, center stem 225 which is mated with CD aperture 310, is lowered onto base 210 and thereby CD 300 is lowered onto label portion 30 in a generally uniform manner following application of pressure.

Following application of the object to label portion 30, the object may be removed using one or more finger apertures 240 positioned through base 210. In operation, the object, such as CD 300, may be applied to label portion 30 and still remain somewhat affixed to apparatus 200 through carrier portion 40 of label assembly 10. By extending fingers through finger apertures 240, CD 300 is separated from carrier portion 40 and expelled from base 210 with label portion 30 attached.

In addition to center stem 220 mating with center hole 35, label assembly 10 may be further indexed on apparatus 200 using at least one index hole 45 in label assembly 10 and at least one corresponding locating element 230 in apparatus 200.

According to one preferred embodiment of this invention, apparatus 200 includes arm 250 that is moveable into contact with at least a portion of label assembly 10 prior to transferring label portion 30 of face sheet 20 onto the object such as a CD 300 and/or CD jewel case 320. Arm 250 is preferably moveable between a position generally flush with base 210 and a position away from base 210. As shown in FIGS. 1 and 2, arm 250 may swing from hinge 260 along a side of base 210 between a position on or generally flush with base 210 and a position back away from base 210.

Arm 250 may be positively mated with base 210 when in a position flush with base 210 by aligning locating element 230 of base 210 with arm aperture 252 of arm 250. As a result, locating element 230 may extend first through label assembly 10 and then, when arm 250 is positioned in contact with base 210, locating element 230 extends through arm aperture 252, such as shown in FIG. 1.

Arm 250 preferably swings into contact with at least a portion of label assembly 10, so that as label portion 30 is removed from face sheet 20, the remainder of face sheet 20, or carrier portion 40, is retained and therefore label portion 30 cleanly separates from carrier portion 40 of the remaining label assembly 10. FIG. 6 shows one preferred embodiment of arm 250 that surrounds a central portion of base 210 on three sides so as to retain label assembly 10 as one or more label portions 30 are removed.

In addition, at least one additional label portion may be indexed on apparatus 200 for placement elsewhere, such as a CD jewel case 320. Like the method described above for label portion, an additional portion 63 of back sheet 50 may be removed from face sheet 20 to expose second label portion 32 of face sheet 20. Second label portion 32 may be, for instance, a spine label for a spine of CD jewel case 320, such as shown in FIG. 6. Like label portion 30 described above, second label portion 32 is drawn from label assembly 10 having back sheet 50 and a face sheet 20, wherein additional portion 32 of back sheet 50 is removable from face sheet 20 to expose second label portion 32, such as a spine label. Additional portion 63 preferably includes a greater surface area than second label portion 32. At least one pull tab 64 may extend from a periphery of additional portion 63 to facilitate removal, both visually and physically.

According to one preferred embodiment of this invention, arm 250 may further include locating aperture 270 that corresponds with a size and placement of second label portion 32 when arm 250 is in a flush position relative to base 210. As a result, an object may be inserted through locating aperture 270 in arm 250 to transfer second label portion 32 of face sheet 20 onto the object. For instance, an edge of CD jewel case 320 may be inserted through locating aperture 270 in arm 250 to transfer second label portion 32 (a spine label) onto CD jewel case 320.

According to one preferred embodiment of this invention, two or more label assemblies 10 may be joined end-to-end along a longitudinal boundary 120. Preferably, each adjacent label assembly 10 is rotated 180° relative to each other to facilitate application of each label portion 30 to a CD 300. As such, each label portion 30 of each adjacent label assembly 10 may be printed and then a first label assembly 10 may be inserted into apparatus 200 to apply label portion 30 followed by rotating the pair of label assemblies 180° and then inserting the second label assembly 10 into apparatus to apply label portion 30 to a second CD 300.

Figure 11:
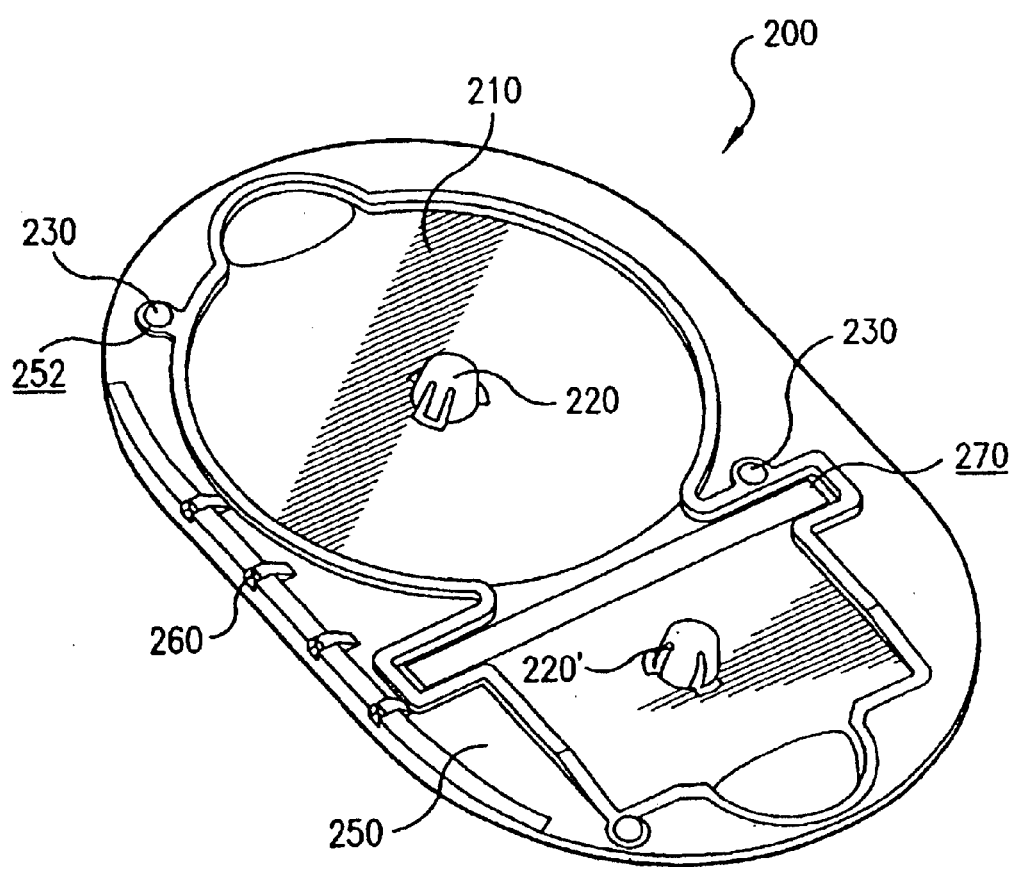
FIG. 11 illustrates a top perspective view of an apparatus for applying a label to an object according to one preferred embodiment of this invention.

FIG. 11 illustrate an additional preferred embodiment of apparatus 200 for use in applying label assembly 10 as generally described above and in accordance with the present invention. Apparatus 200 shown in FIG. 11 is particularly suitable for applying a label to a CD, DVD, mini CD or business-card CD. Apparatus 200 preferably includes base 210 and which is molded or otherwise formed of plastic or any other suitable strong, durable and generally rigid material known to those having ordinary skill in the art. Depending upon the desired application, base 210 may include a recessed and/or otherwise contoured portion for accommodating a particular object, such as a CD or a business-card CD. Base 210 may further include a recessed and/or otherwise contoured portion for accommodating a spine of jewel case 320.

According to a preferred embodiment of this invention, for use with labeling CDs, base 210 includes center stem 220 extending from a center area of the contoured portion of base 210. Center stem 220 is preferably sized to fit through a CD aperture 310 and may include one or more particular features, such as described above, that positively maintain CD 300 in position and/or permit CD 300 to be lowered onto base in a uniform fashion. As shown, base 210 may additionally include second center stem 220' for accommodating business-card CDs and/or mini CDs.

Apparatus 200 shown in FIG. 11 further includes three locating elements 230 extending from base 210, one on a side of the recess for the CD and one on a side of the recess for the business-card CD/mini CD, with a common locating element 230 between them. Locating elements 230 are preferably mateable with index holes 45 and used to position label assembly 10 in a desired position on apparatus 200.

In addition, apparatus 200 shown in FIG. 11 includes arm 250 that is hinged to base 210 along hinge 260. Arm 250 preferably overlaps an edge of CD 300, mini CD and/or business-card CD prior to application of label portion 30. Arm 250 shown in FIG. 11 additionally includes a locating aperture 270 for placement and indexing a spine of jewel case 320 for application of second label portion 32 to the spine of jewel case 320.

Figure 12:
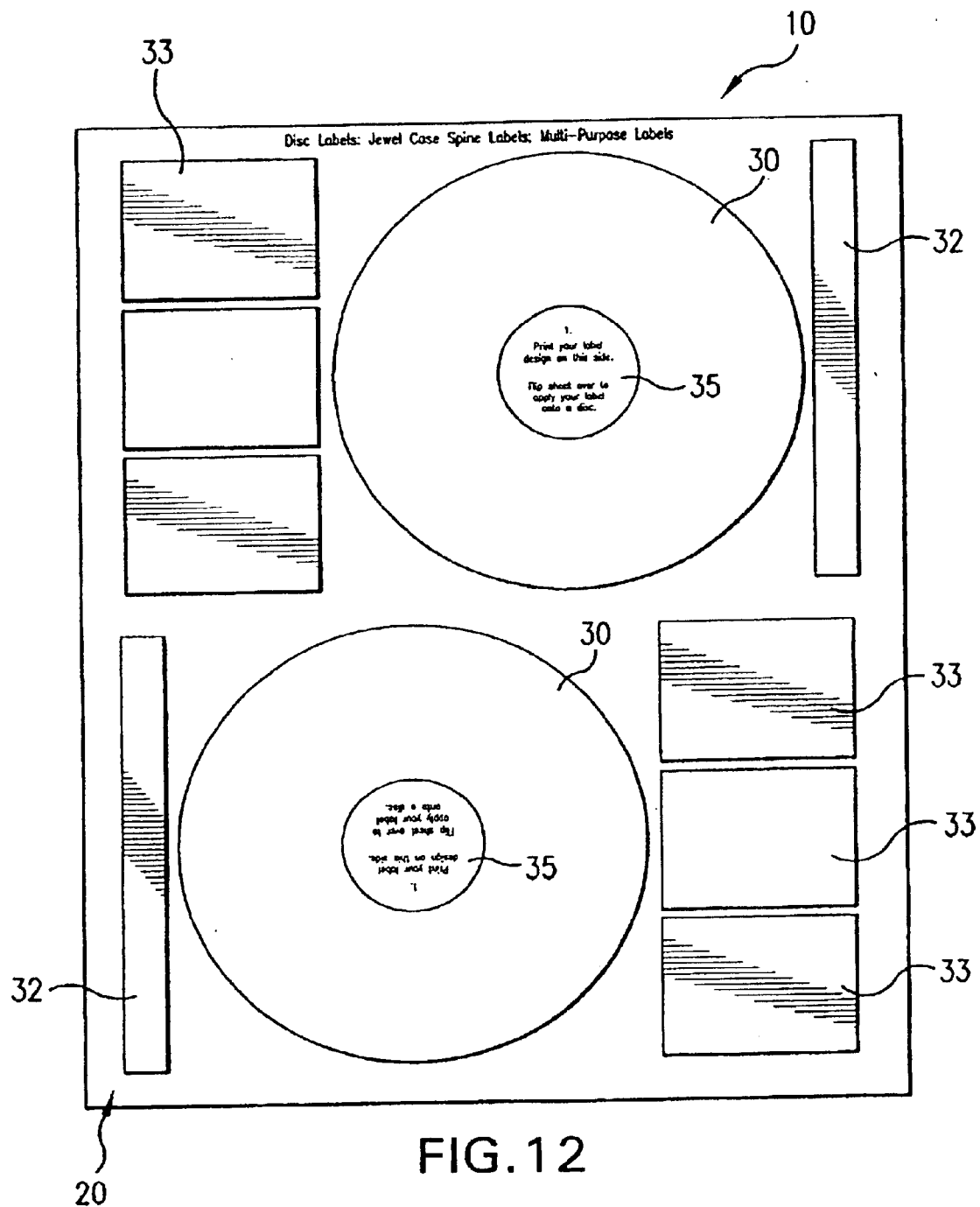
FIG. 12 illustrates a top view of a label assembly according to one preferred embodiment of this invention.
Figure 13:
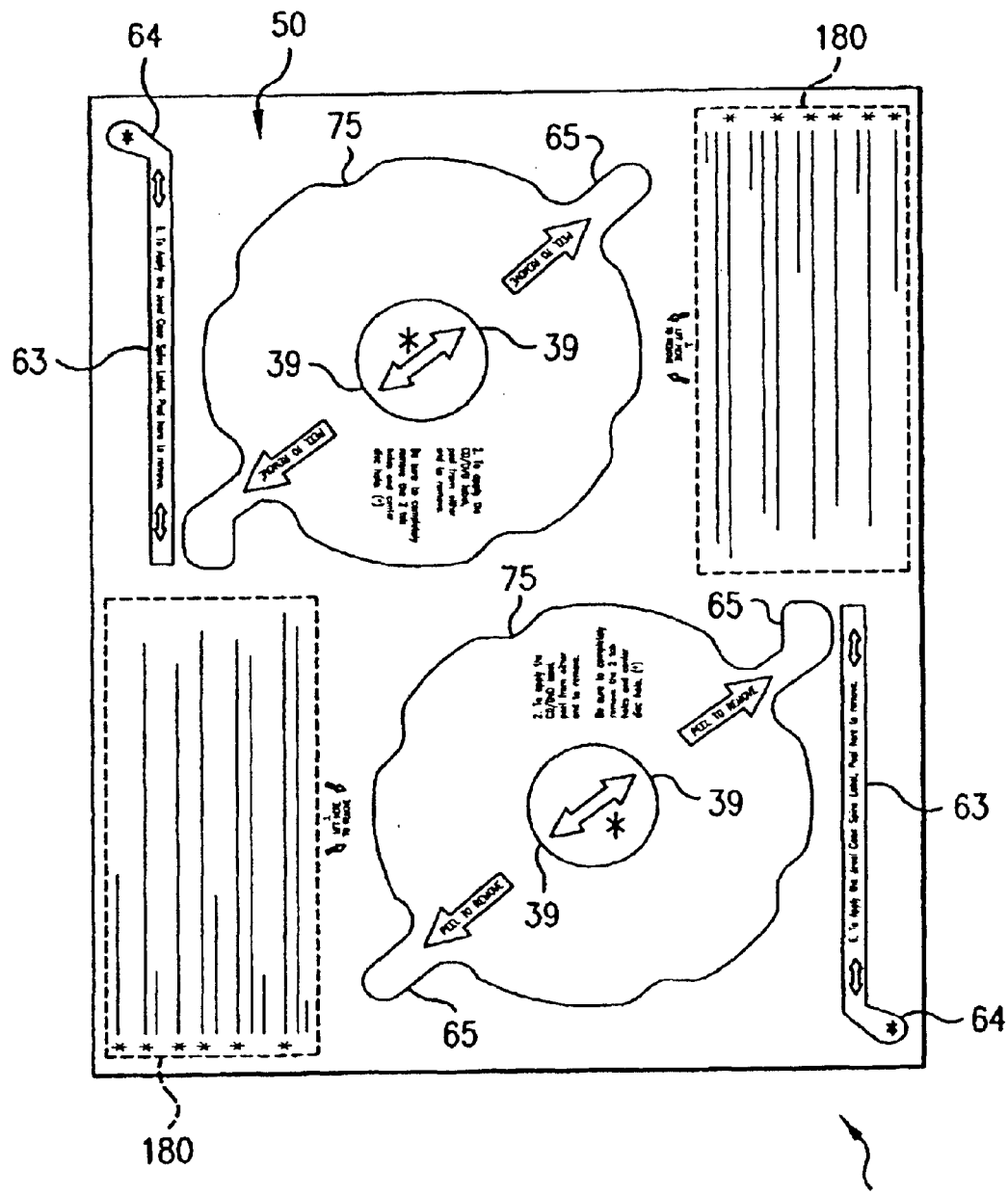
FIG. 13 illustrates a bottom view of a label assembly of the label assembly shown in FIG. 12.

FIGS. 12 and 13 show label assembly 10 according to another preferred embodiment of this invention. As shown, face sheet 20 of label assembly 10, shown in FIG. 12, includes label portion 30, second label portion 32 and additional label portions 33 for printing and application as needed. On a reverse side of face sheet 20 is back sheet 50, shown in FIG. 13. Back sheet 50 preferably includes a corresponding first portion 60 for removing to expose an adhesive side of label portion 30. Also, additional portion 63, corresponding with second label portion 32, is removable to facilitate application of second label portion 32 to spine of jewel case 320.

As shown, back sheet 50 preferably includes printed detailed application instructions 180. The detailed application instructions 180 on back sheet 50 may include: "1. Print your label design on opposite side. 2. Peel and remove the backing sheet from the label (as shown), removing the 2 tab holes and the center disc hole. 3. Align tab holes and lower the sheet onto the applicator, printed side down (sticky side up.) 4. Lower the applicator lid over the label. Firmly press the disc face down onto the label. Apply even pressure to ensure proper labeling. 5. Lift and remove the disc from the applicator by gripping the disc edge (as shown) and pulling the labeled disc up and away from the backing sheet. Smooth down the label surface to ensure 100% adhesion. 6. To apply the Jewel Case Spine Label, peel and remove the spine label backing strip (as shown.) Firmly press the end of the jewel case onto the label using the applicator slot as a guide. Lift the jewel case to finish." Although the preceding language differs slightly from the nomenclature used herein, similar instructions may be used with nomenclature consistent with that used herein.

Figure 14:
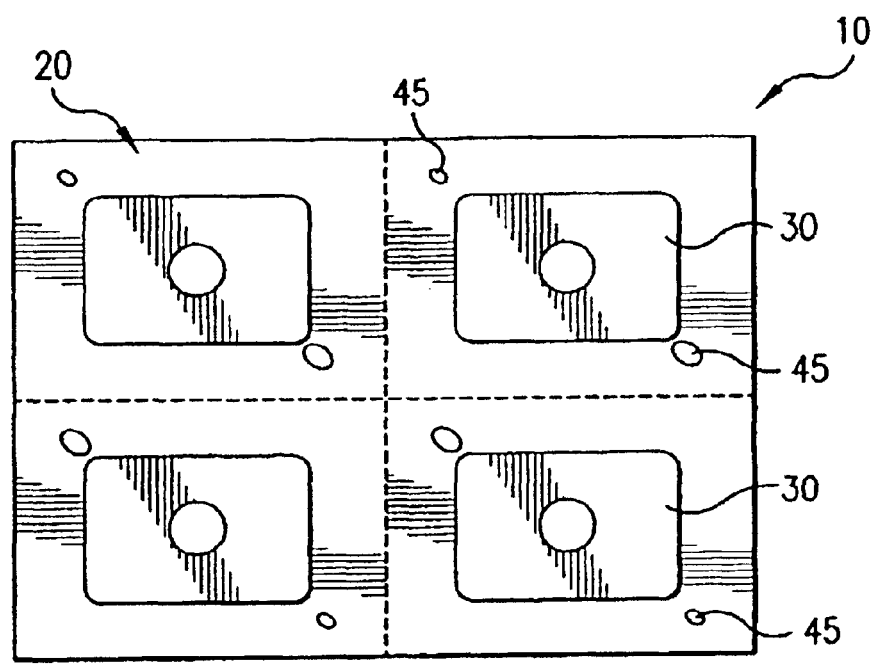
FIG. 14 illustrates a top view of a CD business card label assembly according to one preferred embodiment of this invention.
Figure 15:
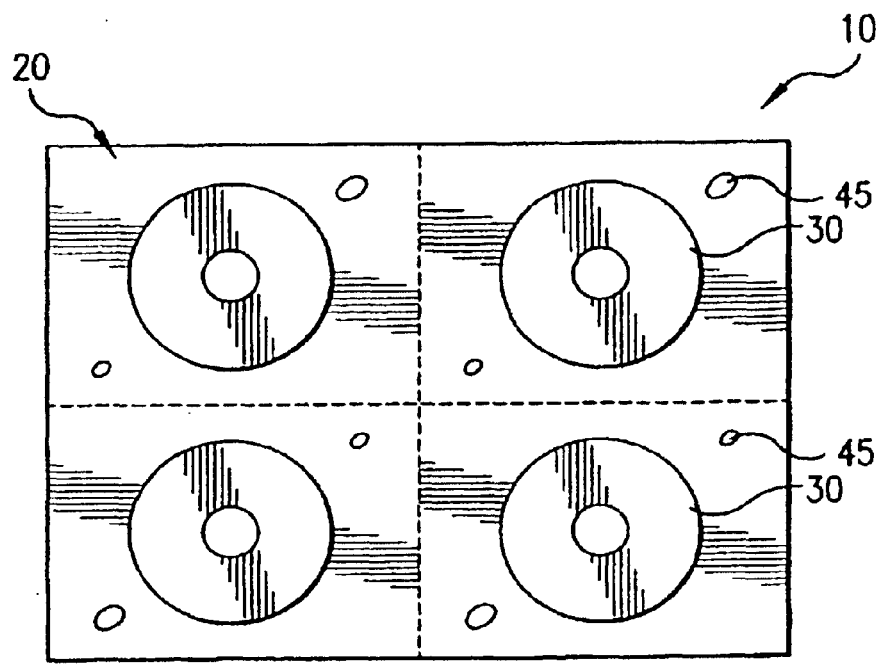
FIG. 15 illustrates a top view of a mini CD label assembly according to one preferred embodiment of this invention.

FIGS. 14 and 15 show face sheet 20 side of label assembly 10 for application to business-card CDs (FIG. 14) and for application to mini CDs (FIG. 15). Such label assemblies 10 operate in a consistent fashion to those described above and may be combined in separable sheets of two, three and four or more. Such separable sheets may be printed and then separated along perforations or other lines of weakness to facilitate application using apparatus 200 such as those described herein. In addition, label assembly 10 may include combinations of label portions 30 for application to regular CDs, business-card CDs and/or mini CDs. Therefore, a single label assembly 10 may include label portion 30 for a regular CD, label portion 30 for business-card CD and/or label portion 30 for mini CD.

While in the foregoing specification this invention has been described in relation to certain preferred embodiments thereof, and many details have been set forth for purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

We claim:

1. A label assembly comprising:
   a face sheet having a label portion removable with respect to a carrier portion of the face sheet;
   a back sheet, a first portion of the back sheet removable with respect to a second portion of the back sheet to expose the label portion, the first portion of the back sheet generally coextensive with the label portion of the face sheet; and
   at least one index tab extending from a periphery of the first portion;
   a center hole positioned in the label portion; and
   a die cut extending in an arc partially along a perimeter of the center hole through the face sheet and the back sheet, wherein the arc extends between approximately 1° and 180° along the center hole.

2. The label assembly according to claim 1 wherein the die cut is positioned along a side of the center hole that corresponds with a side of the first portion that is removed first.

3. The label assembly according to claim 1 wherein the arc extends between approximately 5° and 90° along the center hole.

4. The label assembly according to claim 1, further comprising:
   a center hole positioned in the label portion, the center hole opened upon removal of the first portion, wherein the center hole is offset relative to a corresponding die cut in the first portion.

5. The label assembly according to claim 1 further comprising a boundary extending along at least one edge of the label assembly, the boundary dividing a second label assembly positioned 180° relative to the label assembly.

6. A label assembly comprising:
   a face sheet having a removable label portion;
   a back sheet having a removable first portion so that when the first portion is removed from the label assembly, a remaining portion of the back sheet is attached to the label portion of the face sheet;
   at least one index hole positioned in the remaining portion of the back sheet;
   a center hole positioned in the label portion; and
   a die cut extending in an arc partially along a perimeter of the center hole through the face sheet and the back sheet, wherein the arc extends between approximately 1° and 180° along the center hole.

7. The label assembly according to claim 6, wherein the remaining portion of the back sheet includes two or more retainers that are adhered to the label portion.

8. The label assembly according to claim 6, further comprising at least one index tab extending from a periphery of the first portion, the index tab including the index hole.

9. A label assembly for a CD comprising:
   a face sheet having a generally circular label portion removable with respect to a carrier portion of the face sheet;
   at least one index hole positioned in the face sheet, the at least one index hole mateable with an applicator apparatus;
   a center hole positioned in the label portion; and
   a die cut extending in an arc partially along a perimeter of the center hole through the face sheet and the back sheet, wherein the arc extends between approximately 1° and 180° along the center hole.

10. The label assembly of claim 9, further comprising:
    at least one index tab extending from the label portion, the index tab corresponding with the index hole.

11. The label assembly of claim 10, further comprising:
    at least one additional label removable from the carrier portion of the face sheet, the at least one additional label for placement on a jewel case of the CD.

12. The label assembly according to claim 9 further comprising a boundary extending along at least one edge of the label assembly, the boundary dividing a second label assembly positioned 180° relative to the label assembly.

* * * * *